United States Patent [19]
Barnum et al.

[11] 3,920,216
[45] Nov. 18, 1975

[54] LEVER OPERATED CONTROL VALVE

[75] Inventors: Thomas G. Barnum, Fox Point; Frank Hessler, Milwaukee; Robert A. Larson, Germantown, all of Wis.

[73] Assignee: Bradley Corporation, Menomonee Falls, Wis.

[22] Filed: May 22, 1974

[21] Appl. No.: 472,296

[52] U.S. Cl. .................................. 251/51; 251/52
[51] Int. Cl.² ........................................ F16K 31/48
[58] Field of Search .............. 251/51, 52, 50, 55, 47

[56] References Cited
UNITED STATES PATENTS

| | | | |
|---|---|---|---|
| 1,142,917 | 6/1915 | Simmons | 251/51 X |
| 1,225,987 | 5/1917 | McNeil | 251/51 X |
| 2,421,810 | 6/1947 | Simpson | 251/51 X |
| 2,710,736 | 6/1955 | Miller | 251/51 |
| 2,883,142 | 4/1959 | Colonna | 251/51 |
| 3,229,710 | 1/1966 | Keller | 251/368 X |

Primary Examiner—Arnold Rosenthal
Attorney, Agent, or Firm—Quarles & Brady

[57] ABSTRACT

A lever operated control valve for supplying water to a wash-fountain has a valve body with a valve seat between an inlet and an outlet, and a control cylinder located to one side of the body. A hollow operating plunger has a piston portion within the cylinder and a valve stem extending from the piston portion that extends through the valve seat for operation by a lever assembly on the side opposite the control cylinder. A valve head on the stem engages the valve seat, and is normally held closed by a spring acting upon the plunger. Relief ports are formed in the plunger to facilitate rapid dumping of water from the control cylinder to achieve a rapid opening of the valve, and a bypass channel with a needle valve admits reentry of water into the control cylinder at a slow rate of flow to have a delayed closing of the valve.

4 Claims, 4 Drawing Figures

U.S. Patent  Nov. 18, 1975  3,920,216
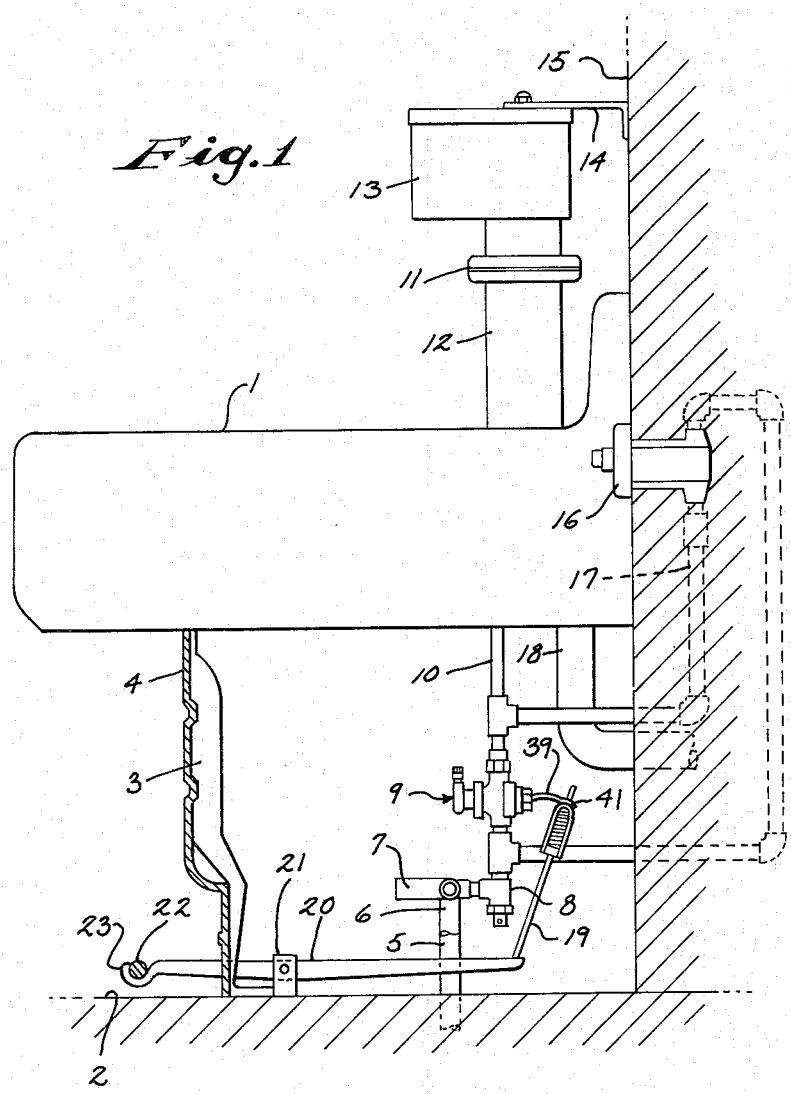
Fig.1
Fig.2
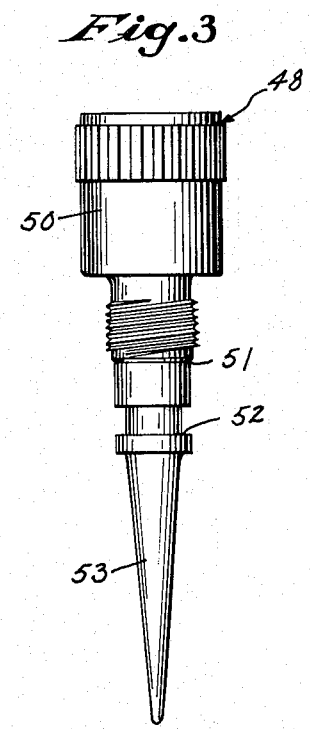
Fig.3
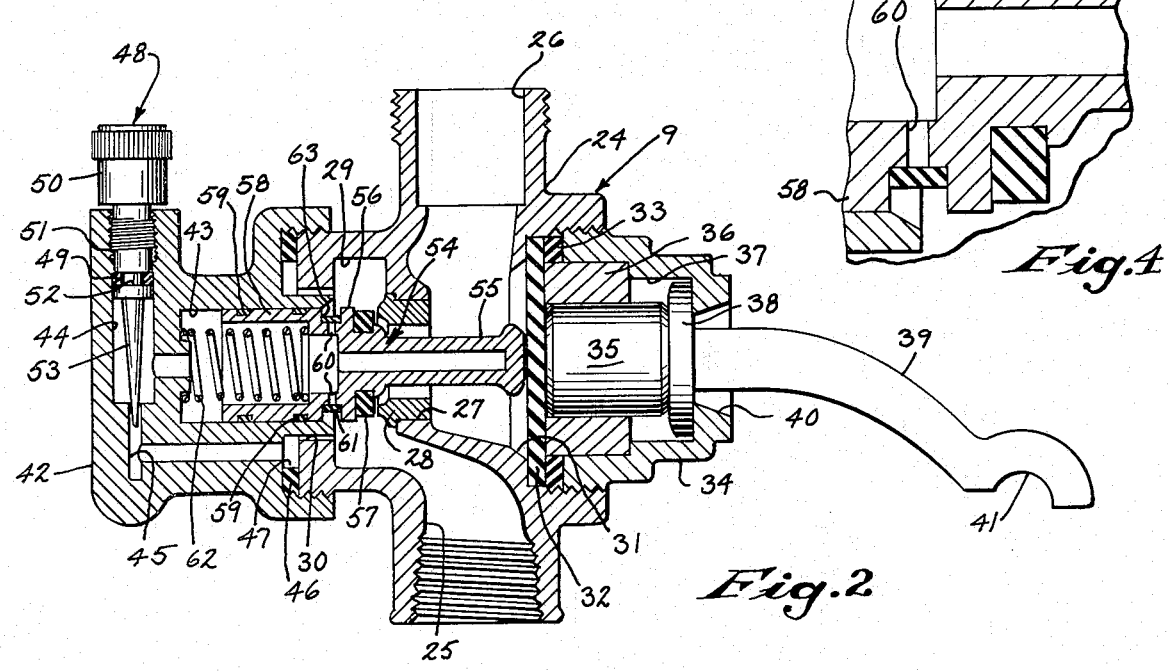
Fig.4

LEVER OPERATED CONTROL VALVE

BACKGROUND OF THE INVENTION

The invention relates to fluid control valves, and more particularly to an improved valve which may be opened rapidly, but which has a slow, controlled closing action. The preferred embodiment is especially useful in a washfountain, but the invention is not limited to this application and may be utilized with other devices when the same operating characteristics are desired.

Typical washfountain arrangements employ foot-operated valves having adjustable closing periods, such as the type disclosed in U.S. Pat. No. 2,243,957 to H. E. Heine et al dated June 3, 1941, U.S. Pat. No. 2,398,149 to Mullett et al dated Apr. 9, 1946, and U.S. Pat. No. 2,836,080 to H. G. Mullett dated May 27, 1958. Each of these valves has a housing formed to provide a fluid flow passage between an inlet and an outlet with a valve opening therebetween. A reciprocating plunger has a stem engaged by an operating member, and a hollow piston opposite the stem that is frictionally fitted within the cylindrical opening of a tapered guide cap. The plunger includes a valve head normally held closed against the valve seat by means of a spring mounted between a supplementary pilot valve lying within the piston and the end of the guide cap. The valve is opened by actuation of the operating member, and the closing period of the valve is varied by adjusting the clearance, or fit, between the outside surface of the piston and the inside surface of the guide cap. Water must pass through this clearance into the guide cap in order for the plunger to move back to a valve closing position. The rate of water passage is reduced by a tightening of the adjusting sleeve, which tightening drives a tapered part of the guide cap into a tapered bore, and this wedges the guide cap into a tighter fit with the plunger piston. The piston then acquires a slower closing rate, since the reduced clearance establishes a time delay for water to build up at the back of the piston and assist closure of the valve. When the operating member moves the plunger to valve opening position, then the supplementary pilot valve opens to immediately relieve fluid pressure in the space behind the piston, so that the plunger may quickly open to allow flow through the valve to the outlet.

In operation of these prior art valves the internal surfaces of the guide cap and the exposed contours of the piston are continually in contact with water. As a result, corrosion and mineral deposition can occur, causing malfunction of the working components so that the valves seize and fail to operate. Consequently, the valves will tend to behave erratically, and the present invention is intended to alleviate these problems.

SUMMARY OF THE INVENTION

The present invention relates to a rapidly opening, slowly closing valve, and it more specifically resides in a valve plunger working in a control cylinder with the provision of relief ports in the plunger for allowing an unimpeded opening of the valve, and a bypass channel for feeding fluid back into the cylinder with a low rate of flow for imparting a slow, controlled closure of the valve.

The prior art flow control valves upon which the present invention improves are characterized by a reciprocable plunger having a piston that moves back and forth within a control cylinder. The operation is a dash-pot type of function, in which fluid in the space, or pressure chamber, defined by the piston and the cylinder walls must escape in order to allow the plunger to move into a valve open position, and in which fluid must flow back into this space in order for the plunger to travel back to valve closed position. It is desirable to retain the basic characteristics of this dash-pot type function, but to overcome the prior deficiencies in which adjustment was difficult to make, and the plunger might freeze in position by reason of sedimentary deposition and corrosion of parts.

For achieving a rapid opening action of the valve the fluid captured within the space bounded by the control cylinder and piston must be rapidly dumped. The invention uniquely achieves this goal by providing an array of relief ports in the plunger which are normally closed by an elastic band. This band functions as a one-way valve for each relief port, permitting rapid dumping, but prohibiting return flow into the plunger and control cylinder. To control return flow a bypass channel is interposed between the inlet and the interior of the control cylinder. A needle type valve governs a relatively slow return of fluid when the plunger is urged toward valve closing position. A vacuum is created within the cylinder and piston by this return movement to valve closed position, and the movement cannot take place without the reentry of fluid. By controlling the rate of reentry, a slow closing valve action is achieved.

It is a general objective of the invention to provide a lever operated control valve which operates by a single setting of a needle valve to prevent fast closure of the movable piston, so that water hammer will not occur. The needle valve eliminates the structural need for a snug, friction fit between a piston and a guide cap, as previously employed in the prior art.

Another objective is the fabrication of the operating parts of a valve from synthetic, non-corrosive, molded plastic. By using an acetal polymer material, such as Celcon, faulty operation heretofore induced by deposition of sediment and chemical attack is alleviated. The cost of manufacturing the control valve is also significantly decreased, since plastic elements are less expensive than metal parts.

A further object is the provision of control components for a valve which can be incorporated into prior art valve bodies and used with existing operating lever assemblies.

Another object is to provide a more reliable foot valve operation for washfountains, wherein an efficient opening of the valve will occur due to the use of relief ports about the periphery of the plunger which eliminate supplementary valves as heretofore existed.

The foregoing and other objects and advantages of the invention will appear from the following description. In the description reference is made to the accompanying drawing which forms a part hereof, and in which there is shown by way of illustration and not of limitation a preferred embodiment of the invention. Such embodiment does not represent the full scope of the invention, but rather the invention may be employed in many different embodiments, and reference is made to the claims for interpreting the breadth of the invention.

BRIEF DESCRIPTION OF THE DRAWING

FIG. 1 is a side view in elevation of a semi-circular washfountain incorporating a lever operated control valve embodying the present invention, parts being shown in section to illustrate the understructure of the washfountain, FIG. 2 is an enlarged view in cross-section of the lever operated control valve shown in FIG. 1, FIG. 3 is an enlarged view of a control needle employed in the lever operated valve of FIG. 2, and FIG. 4 is an enlarged view showing relief ports in the operating plunger of the valve.

DETAILED DESCRIPTION OF THE PREFERRED EMBODIMENT

Referring to FIG. 1, a washfountain assembly includes a semicircular bowl 1 supported above the floor 2 by a series of radially spaced legs 3 (only one of which is shown) joined to a semi-circular pedestal panel 4. Hot and cold water pipes 5 and 6 project upwardly from the floor 2 for connection to a mixing valve 7 which is secured to a volume regulator 8. A lever operated control valve 9 has a lower end associated with the volume regulator 8, and an upper end coupled to a supply pipe 10 which directs water to a sprayhead ring 11 mounted on an upstanding tubular support 12 rising at the back of the bowl 1. The upper portion of the tubular support 12 carries a soap dispenser 13 whose position is maintained by means of a restraining bracket 14 connected to a wall 15 against which the washfountain assembly is installed. A metering valve 16 for measuring the quantity of water flowing through the supply pipe 10 is disposed in the wall 15 and is connected above and below the control valve 9 by means of pipes 17. The bowl 1 is provided with a drain pipe 18 which extends through the wall 15 as shown, but which may alternatively be routed downwardly through the floor 2.

The lever operated control valve 9, in which the invention is embodied, is operatively connected to a foot actuating mechanism such as that disclosed in said U.S. Pat. No. 2,836,080, issued May 27, 1958, and includes a spring biased operating rod 19 linked to an elongate foot lever 20 which is pivotally mounted upon an upstanding apertured bracket 21 of the leg 3. A crescent shaped treadle ring 22 is seated within a hooked end 23 of the foot lever 20, so that foot pressure exerted at any point along the treadle ring 22 will cause the lever 20 and accompanying operating rod 19 to deflect upwardly to actuate the valve 9. The lever operated control valve 9 functions to feed tempered water through the supply pipe 10 into the bowl 1 via the sprayhead ring 11.

As illustrated in FIG. 2, the improved control valve 9 includes a body 24 preferably cast in brass, and formed with an inlet passage 25, an outlet passage 26 and a port 27 interconnecting these passages 25 and 26. A replaceable valve seat 28 is inserted within the port 27. The inlet passage 25 includes an annular cavity 29 having an outwardly extending bore 30 in aligned communication with the port 27. The outlet passage 26 has a tapered bore 31, similarly in line with the port 27. A resilient diaphragm 32 closes the bore 31 and a fiber washer 33 is sealingly secured against the diaphragm 32 by a bell nut 34 which is screw threaded into the body 24.

An operating plunger 35, seated at one end against the diaphragm 32, is slidably mounted within a central opening of a guide ring 36 disposed within the larger portion of a stepped bore 37 in the bell nut 34. The other end of the operating plunger 35 abuts a disc head 38 of a tiltable operating lever 39, which lever curves downwardly from a flared opening 40 formed in the outer end wall of the bell nut 34. The operating rod 19, shown in FIG. 1, engages a hook portion 41 formed at the end of the lever 39.

A control housing 42 having a cylinder 43 aligned with and opening upon the annular cavity 29 is screwthreaded onto the body 24. A small chamber 44 is behind and communicates with the cylinder 43, and a bypass channel 45 enters the bottom of the chamber 44. A circular gasket 46 is interposed between the housing 42 and the valve body 24, and defines a central opening 47 through which the bore 30 communicates with the bypass channel 45. A threaded control needle 48 is adjustably mounted within the chamber 44, and an encircling O-ring 49 provides a seal at the upper end of the chamber 44. The needle 48 extends downward for the length of the chamber 44 and into the channel 45 to form a needle type valve.

As a particular feature of the invention, the threaded control needle 48, as best seen in FIG. 3, includes an enlarged cylindrical head 50 knurled at the top, an intermediate reinforcing portion 51 suitably threaded, a stepped neck section 52 upon which the O-ring 49 is received, and a thin conical needle shaft 53 tapering downwardly. The enlarged head construction 50 has an underside that will strike control housing 42 when the needle 48 is turned downward for closing the valve. Thus, the control needle 48 will be prevented from being driven too far downwardly into the channel 45, which condition would destroy the conical needle shaft 53 and impair the metering function of the valve.

A hollow plunger 54 is movably disposed within the valve body 24 that has a stem portion 55 extending through the valve seat 28. The stem 55 bears against the diaphragm 32 at its right hand end, so that translating movement can be imparted to the plunger 54 upon an operation of the lever 39. The plunger 54 also includes a medial valve head portion 56 surrounded by a seat washer 57, and a hollow piston 58 which slides back and forth in the cylinder 43. A pair of O-rings 59 are provided on the piston 58 to maintain a watertight seal between the outer surface of the piston 58 and the surrounding walls of the cylinder 43, and to reduce frictional engagement of these surfaces during sliding movement therebetween as had occurred in the prior art.

Referring to FIG. 4, the hollow piston 58 is formed with a series of circumferentially spaced relief ports 60 which communicate radially between the hollow interior and a small groove 63 around the outside of the right hand end of the piston portion. These ports 60 enter upon the annular cavity 29, which is a part of the fluid duct through the valve body 24. A flexible rubber ring 61 seats within the groove 63 and closes over the ports 60. Normally, the valve head 56 and accompanying washer 57 are held closed against the valve seat 28 by means of a coil spring 62 interposed between the piston 58 and an end wall of the cylinder 43.

Initially, water is supplied to the inlet 25 and annular cavity 29 of the control valve 9, and flow occurs through the bypass channel 45 and the restricted needle valve into a pressure chamber defined by the cylinder 43 and the hollow plunger 54. Water pressure builds up in the plunger 54 and assists the closing force of the spring 62 to maintain the valve closed.

Upon depression of the treadle ring 22, the foot lever 20 will pivot upwardly causing the operating rod 19 to similarly deflect within the curved notch 41 formed in the operating lever 39. This movement forces the disc head 38 to exert an inward thrust on the operating plunger 35 causing flexure of the diaphragm 32 against the stem portion 55 of the plunger 54. As a result, the seat washer 57 moves away from the valve seat 28, thereby allowing water flow through the valve 9 to the outlet 26 and the supply pipe 10. During this opening movement the plunger 54 is moved to the left so that the piston 58 compresses the spring 62. However, this movement to the left cannot occur if fluid pressure is permitted to build up in the pressure chamber of the cylinder 43. To alleviate such pressure build up water is forced through the relief ports 60 outwardly against the resilient ring 61, and the ring 61 expands to allow water flow into the cavity 29. In this fashion, water otherwise captured within the cylinder 43 and hollow plunger 54 is quickly dumped, so that the plunger 54 can move rapidly to the left in response to an opening movement of the lever 39. It is to be recognized that the small opening of the needle valve would not permit adequate escape of the water to have a fast opening action.

As the operating lever 39 is now released, the plunger 54 travels back toward a valve closing position in response to the closing force of the spring 62. This travel, however, would be hindered by a vacuum developed by the space defined by the hollow piston 58 and the walls of the cylinder 43, if no water were allowed to flow into this space. Water, however, flows through the bypass channel 45 and restricted opening of the needle valve to fill the space. This flow is at a slow rate, so that the return of the plunger and the valve head 56 to valve closed position is similarly slow in comparison to the opening of the valve. Throughout this return stage, the flexible rubber ring 61 is tightly contracted around the hollow plunger 58 to prevent backflow through the relief ports 60, which occurrence would hamper the slow closing action of the piston 54. The outer surface of the ring 61 is exposed to water inlet pressure, so that it functions as a one way check valve for each port 60.

It is an important feature of the invention that a controlled closure of the piston 54 be adequately maintained to eliminate water hammer, and to accomplish this objective the control needle 48 is employed to regulate the volume of water allowed to pass through the restricted orifice in the chamber 44. The control needle 48 attains a progressively slower closing behavior of the piston 54 by turning its neck portion 51 downwardly to move the conical shaft 53 into the lower, or restricted, sector of the chamber 44. An enlarged head 50 is provided on the needle valve 48 to prevent a full tightening action which would cause the diametrically larger portion of the conical shaft 53 to become jammed. Such a condition is to be avoided since water flow is then completely blocked off to the cylinder 43, prohibiting closure of the plunger 54. From a structural standpoint, susceptibility of damage, or possible breakage to the conical shaft 53 of the control needle 48 is markedly reduced by the presence of the head 50.

The control housing 42, control needle 48, and plunger 54 are all preferably molded from a plastic material known as Celcon, an acetal copolymer manufactured by the Celanese Company. Such a plastic exhibits a smoothness and lubricity which resists scale buildup from mineral deposition and prevents chemical attack on the components of the control valve 9. Celcon performs accurately under variable temperature situations, and is extremely stable under high pressure applications. High machining tolerances are not needed for the plunger 54, as previously required; rather, the use of a molded Celcon plunger 54 in combination with the sealing O-rings 59 provides a much more sensitive control valve 9.

It should be fully appreciated that the adjusting housing 42, control needle 48 and plunger 54 are easily incorporated into valve bodies of the prior art and cooperate with existing lever actuators.

Provision of the relief ports 60 in the movable plunger 54 eliminates the need for an auxiliary pilot valve as employed in the prior art, and facilitates a fast opening valve movement unimpeded by water pressure acting on the plunger 54. The use of the control needle 48 relegates the previous structural requirement of a frictional adjustment between a plunger and adjusting cap, and reliably affords a slow closing action of the plunger 54 for prevention of water hammer.

We claim:
1. In a flow control valve having:
   a. a valve body with an inlet and an outlet;
   b. a valve seat between the inlet and outlet;
   c. a control cylinder opening upon said inlet which faces said valve seat;
   d. a plunger having a valve head facing said valve seat and a hollow piston extending from the valve head into said control cylinder for reciprocation therein, said piston having a part thereof exposed to said inlet; and
   e. an operating member for moving said plunger toward a valve open position;
   the combination comprising:
   f. a relief port in said plunger communicating radially between the interior of said hollow piston and said inlet; and
   g. a flexible ring encircling the outside of said hollow piston which covers said relief port to form a check valve therefor, said flexible ring opening radially outward in response to pressure within said hollow piston.

2. A valve as in claim 1 having a control housing that contains said control cylinder, and a bypass channel in said control housing that communicates between said inlet and the end of said cylinder opposite that end from which said hollow piston extends.

3. A valve as in claim 2 having an adjustment valve in said bypass channel.

4. A valve as in claim 1 having a circumferential groove in said hollow piston which opens upon said inlet, said relief port opening into said groove, and said flexible ring being seated in said groove for radial displacement therein.

* * * * *